(12) United States Patent
Peinado Gutierrez et al.

(10) Patent No.: US 11,973,917 B2
(45) Date of Patent: Apr. 30, 2024

(54) CALIBRATING PRINT APPARATUS

(71) Applicant: Hewlett-Packard Development Company, L.P., Spring, TX (US)

(72) Inventors: David Peinado Gutierrez, Sant Cugat del Valles (ES); Montserrat Solano Pallarol, Sant Cugat del Valles (ES); Ferran Olivera Corpas, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/999,258

(22) PCT Filed: May 20, 2020

(86) PCT No.: PCT/US2020/033819
§ 371 (c)(1),
(2) Date: Nov. 18, 2022

(87) PCT Pub. No.: WO2021/236079
PCT Pub. Date: Nov. 25, 2021

(65) Prior Publication Data
US 2023/0209000 A1    Jun. 29, 2023

(51) Int. Cl.
*H04N 1/00* (2006.01)
*H04N 1/60* (2006.01)

(52) U.S. Cl.
CPC ....... *H04N 1/6044* (2013.01); *H04N 1/00968* (2013.01)

(58) Field of Classification Search
None
See application file for complete search history.

(56) References Cited

U.S. PATENT DOCUMENTS

| 6,404,517 | B1 | 6/2002 | Chao |
| 7,871,145 | B1 | 1/2011 | Enge |
| 8,240,807 | B2 | 8/2012 | Bastani et al. |
| 8,259,369 | B2 | 9/2012 | Klassen |

(Continued)

FOREIGN PATENT DOCUMENTS

| EP | 3389251 A1 | 10/2018 |
| WO | 2017/135968 A1 | 8/2017 |

*Primary Examiner* — Henok Shiferaw

(57) ABSTRACT

A print apparatus calibration method is disclosed. The method comprises printing, from each of a plurality of dies of a print head onto a printable substrate, an image in a first color according to a calibration pattern and an image in a second color according to the calibration pattern, the calibration pattern comprising a plurality of patches having a plurality of different densities. The method may comprise scanning, using a scanning unit, the images formed on the printable substrate to generate scanned image data, wherein the images in the first color are scanned by a first scanning module of the scanning unit and the images in the second color are scanned by a second scanning module of the scanning unit. The method may comprise analyzing, using processing apparatus, the scanned image data to identify any differences between printed densities of corresponding patches in different images of the same color. The method may comprise performing a calibration based on the analysis. A print apparatus and a machine-readable medium are also disclosed.

15 Claims, 8 Drawing Sheets

(56) References Cited

U.S. PATENT DOCUMENTS

| | | | |
|---|---|---|---|
| 8,885,215 B2 | 11/2014 | Soria et al. | |
| 9,290,030 B2 | 3/2016 | Arnabat Benedicto et al. | |
| 9,444,974 B2 * | 9/2016 | Omagari | H04N 1/00045 |
| 11,305,550 B2 * | 4/2022 | Stanich | B41J 2/2052 |
| 11,632,487 B1 * | 4/2023 | Terrab | H04N 1/00034 |
| | | | 358/1.9 |
| 11,734,536 B2 * | 8/2023 | Kailey | G06K 15/1881 |
| | | | 358/3.03 |
| 2005/0088474 A1 * | 4/2005 | Juve | B41J 2/04563 |
| | | | 347/17 |
| 2006/0023018 A1 | 2/2006 | Hatayama | |
| 2009/0195581 A1 * | 8/2009 | Bastani | H04N 1/4015 |
| | | | 358/1.9 |
| 2011/0292477 A1 * | 12/2011 | Klassen | H04N 1/6033 |
| | | | 358/505 |
| 2011/0317221 A1 * | 12/2011 | Yasuoka | H04N 1/4078 |
| | | | 358/3.06 |
| 2017/0368856 A1 * | 12/2017 | Barron | B41J 11/46 |
| 2018/0290471 A1 * | 10/2018 | Kubozono | B41J 2/47 |
| 2022/0410564 A1 * | 12/2022 | Martinez Barambio | |
| | | | B41J 2/04586 |

\* cited by examiner

CALIBRATING PRINT APPARATUS

BACKGROUND

In some print apparatuses, print agent may be delivered onto a printable substrate via multiple printing units, sometimes referred to as dies. The dies may form part of, or may be arranged on, a larger printing module, sometimes referred to as a print head. Due to manufacturing tolerances, dies within the same print head may be manufactured slowly differently from another, leading to slight differences in the way in which they deposit print agent. For example, a given number of drops of print agent from nozzles of one die may result in a larger amount of print agent being delivered than the same number of drops of print agent from nozzles of another die.

Page wide array (PWA) print apparatuses may include a print bar extending over the width of the printable substrate to be printed. The print bar may include multiple print heads, and each print head may have multiple dies. Therefore, in such apparatuses, a calibration may be performed so that the amount of print agent deposited from the dies is as intended.

BRIEF DESCRIPTION OF DRAWINGS

Examples will now be described, by way of non-limiting example, with reference to the accompanying drawings, in which.

DETAILED DESCRIPTION

Some print apparatuses, such as page wide array (PWA) print apparatuses deposit print agent (e.g. printing fluid) onto a printable substrate as the printable substrate is advanced beneath a print agent distributor, such as a print head or multiple print heads. Different print heads may deposit print agent onto different regions of the printable substrate. It is intended that different print heads are to deposit print agent uniformly, so that a color formed on the printable substrate by print agent from one print head appears the same as a color formed on the printable substrate by another print head.

Manufacturing tolerances and other factors may lead to print heads being manufactured slightly differently from one another, such that the print heads behave slightly differently from one another during a printing operation. Therefore, various calibrations may be performed, for example to vary an amount (e.g. drop volume) of print agent to be deposited by particular nozzles of print heads, to improve color uniformity.

Examples disclosed herein provide a mechanism by which a print apparatus that is to be calibrated can print a calibration image to be scanned, and the scanned image can be used to perform the calibration. Previous calibration techniques involve the printing of calibration images on multiple pages, one per colorant used in the print apparatus, and the use of a line sensor or spectrophotometer to measure a parameter of various regions within the calibration images. According to examples of the present disclosure, each die of a print head may print the same image according to a calibration pattern, each image being printed in a different color of print agent in use in the print apparatus. The images can all be printed on a single page or sheet, then scanned during a single pass through a scanner. The images are grouped in such a way that images printed in one color are formed in a line so that they can be scanned by one scanning module of the scanner, and images printed in another color are formed in a line so that they can be scanned by another scanning module of the scanner. In this way, the printing and scanning procedure can be performed quickly, and errors (e.g. noise) resulting from differences in the scanning modules do not adversely affect the calibration.

Figure 1:
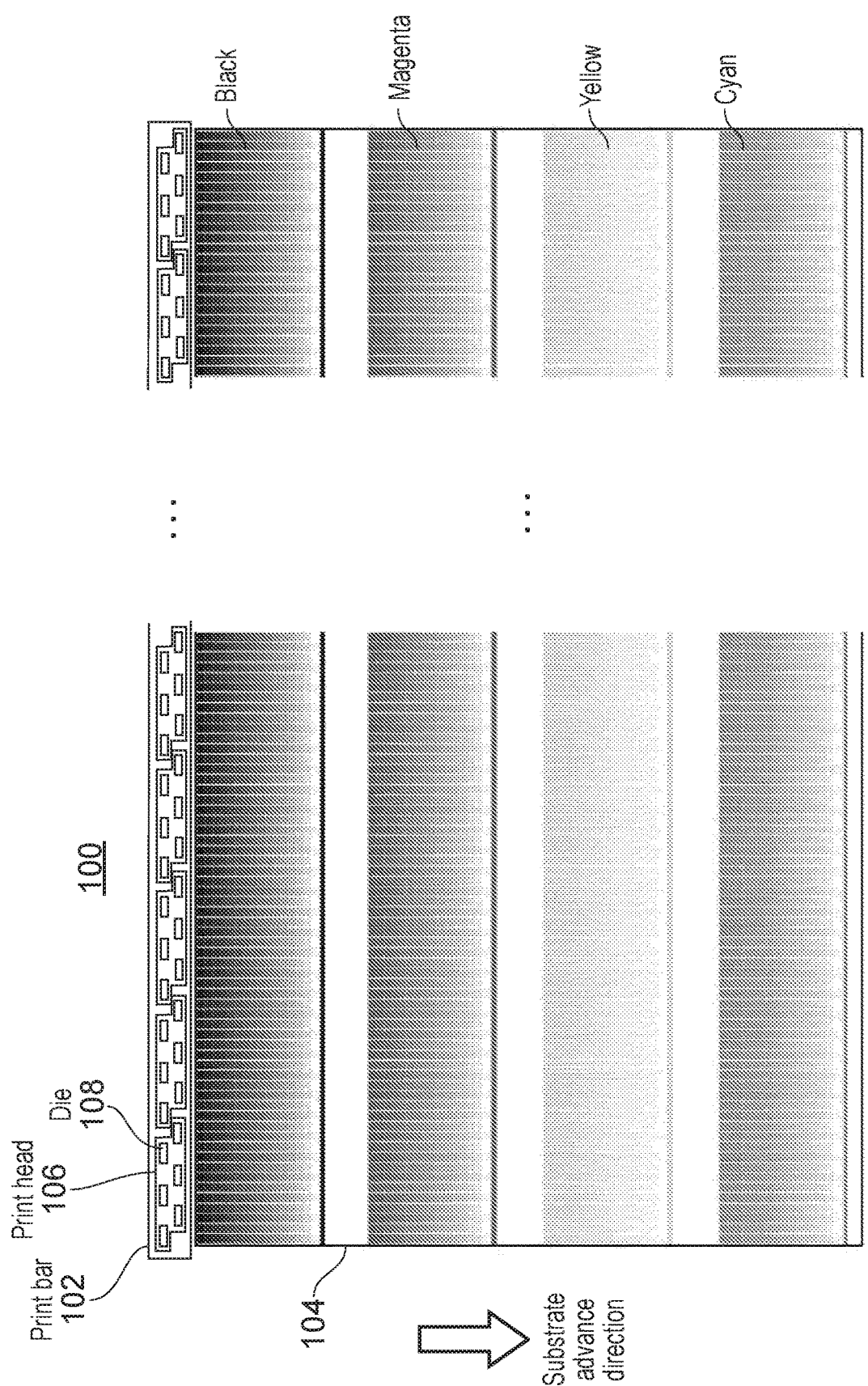
FIG. 1 is a schematic illustration of part of a print apparatus and a printable substrate containing an image.

FIG. 1 is a schematic illustration of an example of part of a print apparatus 100 and an image printed according to examples of the present disclosure. The print apparatus 100 includes a print unit, sometimes referred to as a print unit 102, from which print agent is deposited onto a printable substrate, or print media, 104. In some examples, the print apparatus 100 may comprise a print wide array (PWA) print apparatus, in which the print bar 102 extends over a width of the printable substrate 104. During a printing operation, the printable substrate 104 is advanced in a substrate advance direction, as indicated by an arrow in FIG. 1. The print bar 102 houses a plurality of print modules, sometimes referred to as print heads 106. Each print head 106 comprises or houses a plurality of submodules, sometimes referred to as dies 108. In this example, each print head 106 houses six dies 108. Each die 108 includes a plurality of nozzles from which print agent is delivered during a printing operation. Each die 108 may deliver print agent of several colors. In some examples, the print apparatus 100 may print images using print agent of four different colors (e.g. cyan (C), yellow (Y), magenta (M), and black (K)), with a subset of nozzles within each die 108 delivering print agent of one particular color. In some examples, dies may use a thermal process to cause print agent or print fluid to be deposited from nozzles while, in other examples, dies may include a piezoelectric crystal or piezoelectric material to cause print fluid to be deposited from nozzles.

While the print bar 102 may include any number of print heads 106, in some examples, the print bar includes a sufficient number of print heads to enable the entire width of the printable substrate 104 to be printed. In one example, the print bar 102 includes 48 dies 108, with six dies formed on each of eight print heads 106. In FIG. 1, ellipses are used to indicate that the length of the print bar 102 and the number of print heads 106 and dies 108 may vary (e.g. may be less or more than the number shown).

In some examples, the printable substrate 104 may comprise a sheet or page of print media while, in other examples, the printable substrate may comprise a web substrate, for example formed on a roll. The printable substrate 104 may comprise any material onto which print agent may be deposited during a printing operation, such as paper, cardboard, fabric, or the like.

The printed image shown on the substrate 104 in FIG. 1 includes a plurality of patches of print agent of each color available for the print apparatus 100 which, in the example shown, includes cyan, yellow, magenta and black. In other words, four print fluid cartridges may be installed in the print apparatus 100, containing cyan print fluid, yellow print fluid, magenta print fluid and black print fluid respectively. In other examples, the print apparatus 100 may print other colors and, therefore, may have more or fewer print fluid cartridges installed accordingly. Each die 108 of each print head 106 is to print a series of patches in each of the available colors. An example of a calibration pattern printed according to various examples is shown in greater detail in FIGS. 2 and 3.

Figure 2:
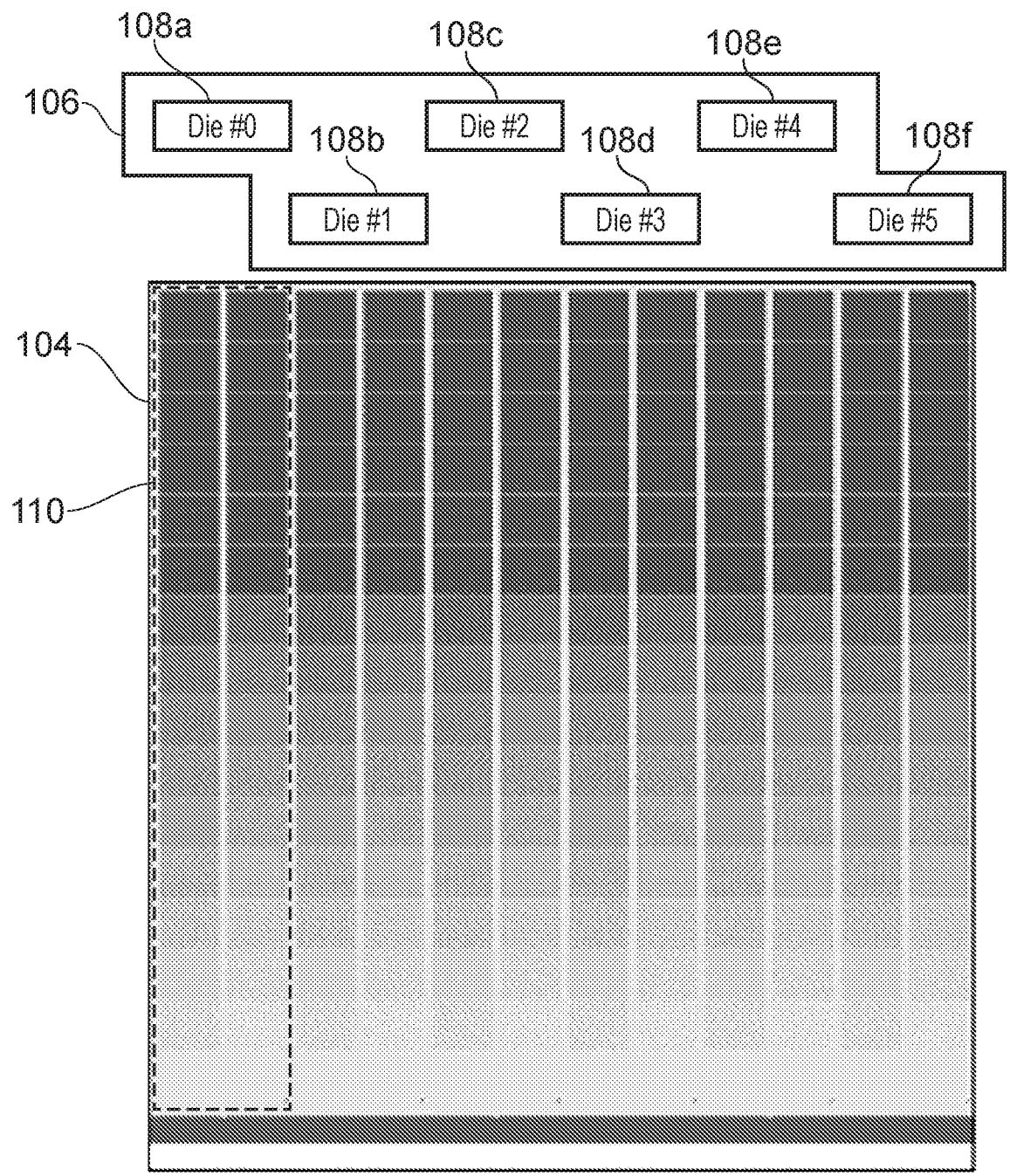
FIG. 2 is an enlarged portion of part of the print apparatus and a portion of the image of FIG. 1.

FIG. 2 is an enlarged version of a portion of the print apparatus 100 and a portion of the printable substrate 104 shown in FIG. 1. Specifically, FIG. 2 shows, schematically, one print head 106, housing six dies: Die #0 108a, Die #1 108b, Die #2 108c, Die #3 108d, Die #4 108e and Die #5 108f, and a portion (i.e. just one color) of the images printed by those dies. In the example shown in FIG. 2, the plurality of patches printed by the Die #0 108a are shown within a dashed box 110, and this plurality of patches may be considered to have been printed according to a particular pattern, sometimes referred to as a calibration pattern. According to the present disclosure, each die 108 is to print an image (e.g. the image shown within the box 110) in each color available to the print apparatus 100, as shown in FIG. 1. As shown in FIGS. 2, the densities of the patches range from 0% (no print agent is deposited onto the printable substrate 104) to 100% (the patch is fully saturated with print agent).

Figure 3:
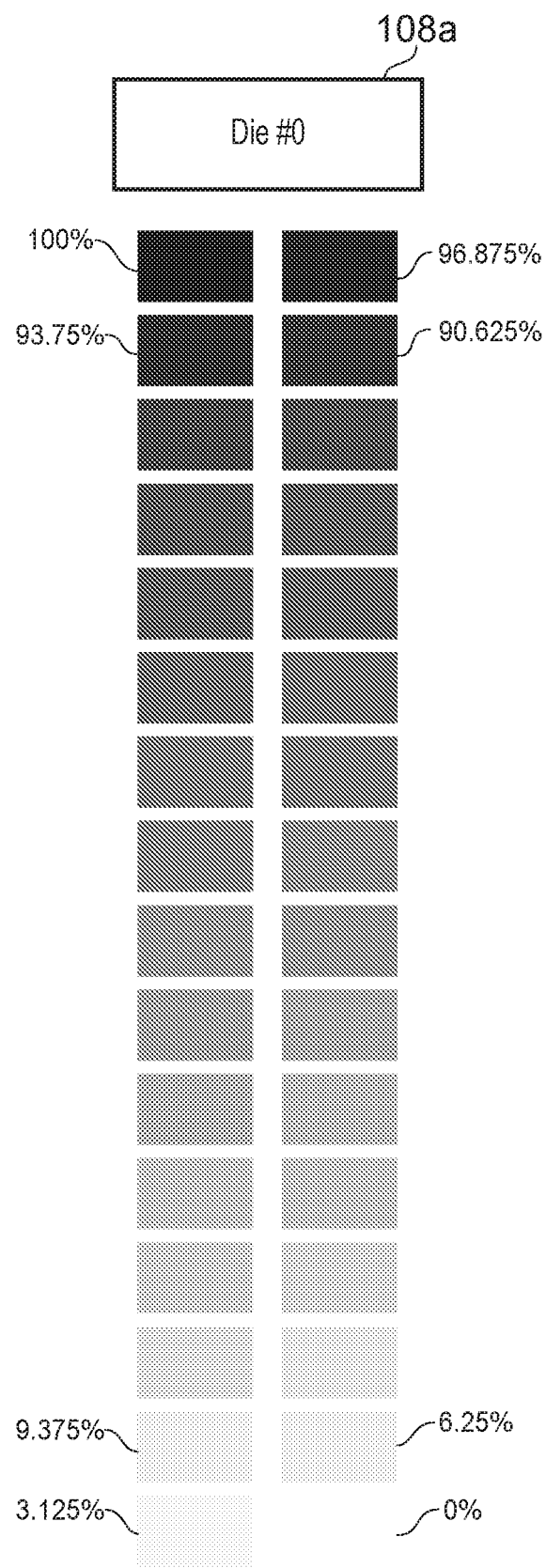
FIG. 3 is an enlarged portion of part of the print apparatus and a portion of the image of FIG. 1.

FIG. 3 is an enlarged version of the image (i.e. the plurality of patches) shown within the box 110 of FIG. 2. The patches may, for example, be those printed in one color by the Die #0 108a. As noted above, each die 108 is to print an image according to the calibration pattern in each color available to the print apparatus 100. The calibration pattern to be printed by each die 108 may include any number of patches, and this is indicated by the ellipsis shown in FIG. 3. However, a more accurate calibration may be achieved with calibration pattern is printed which includes a larger number of patches. In some examples, each die 108 may print an image according to a calibration pattern having 32 patches, or at least 32 patches. In other examples, each die 108 may print an image according to a calibration pattern having 52 patches. In any case, the density (e.g. the color density) of the patches increases from 0% to 100% or decreases from 100% to 0%. Thus, according to some examples, the patches in the calibration pattern may be arranged in order of decreasing density. The densities of the patches may range from 0% density to 100% density. In examples disclosed herein, the density of the patches varies generally along a longitudinal axis of the printable substrate 104 (i.e. in a direction parallel to the substrate advance direction). More specifically, in some examples, the patches in the calibration pattern may be arranged into columns, with patches in adjacent columns varying in density by an incremental amount.

In some examples, the density may increase in equal increments from 0% to 100%. For example, in a calibration pattern that includes 32 patches, the first patch may have a density of 0%, the second patch may have a density of 3.125%, the third patch may have a density of 6.25%, the fourth patch may have a density of 9.375% and so on, as indicated in FIG. 3. The image printed in each color by each die 108 may be referred to as a color ramp, since the color density or saturation ramps up or down as the pattern is printed. It is noted that, in the examples shown in FIGS. 1 to 3, the density of the patches increases as the images are printed according to the calibration pattern (e.g. in a direction opposite to the substrate advance direction); however, in other examples, the density of the patches may decrease as the images are printed.

Figure 4:
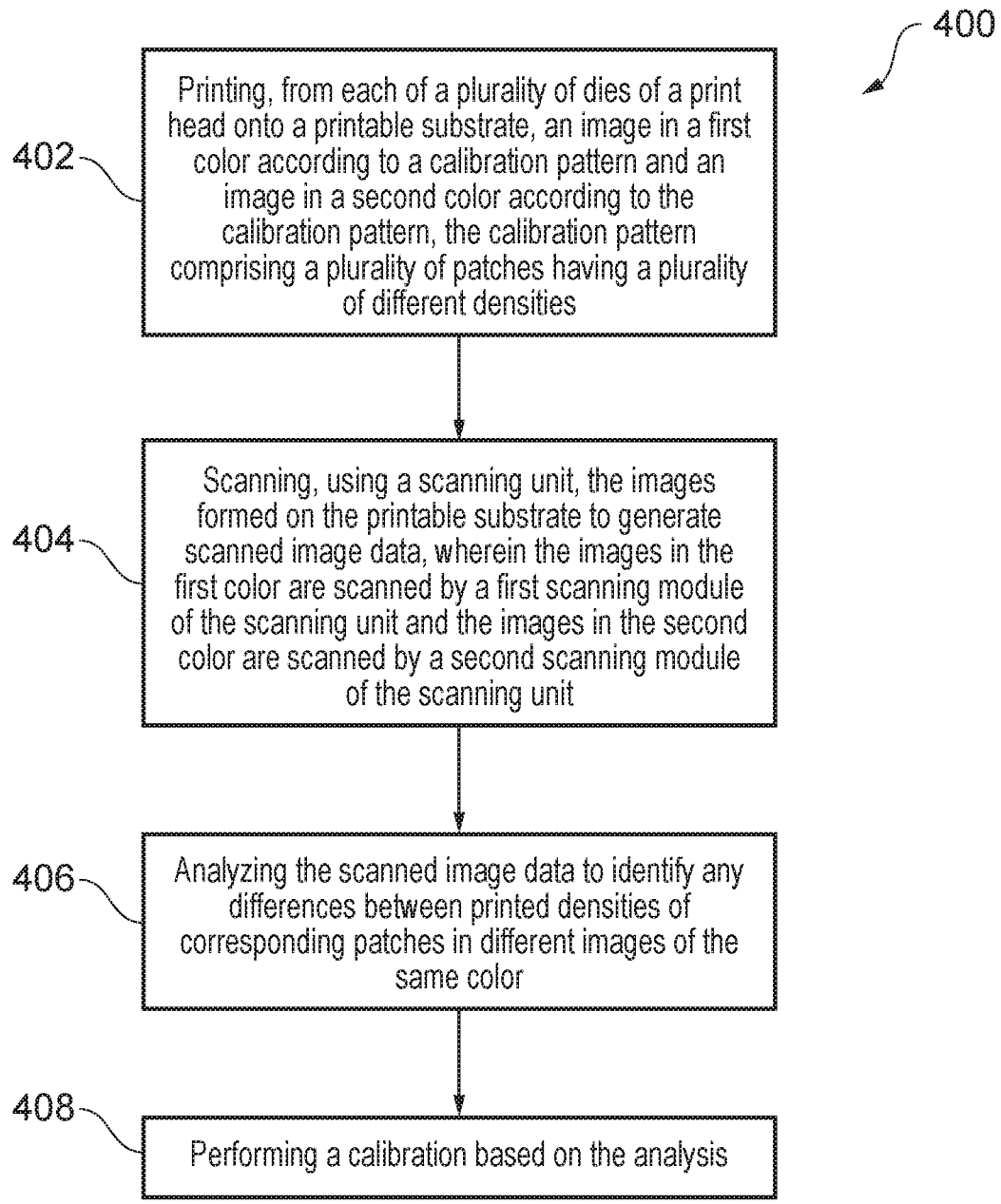
FIG. 4 is a flowchart of an example of a print apparatus calibration method.

According to various examples, the present disclosure relates to a method, which may be referred to as a calibration method or a print apparatus calibration method. FIG. 4 is a flowchart of an example of a print agent calibration method 400. The method 400 comprises, at block 402, printing, from each of a plurality of dies 108 of a print head 106 onto a printable substrate 104, an image in a first color according to a calibration pattern and an image in a second color according to the calibration pattern, the calibration pattern comprising a plurality of patches having a plurality of different densities. For example, the image in the first color may comprise the image shown printed by the Die #0 108a in FIG. 3 (e.g. printed in black print agent), and the image in the second color may comprise an image printed by the same die in a different color (e.g. printed in magenta print agent). As noted previously, the image shown in FIG. 3, which is printed by the die 108a according to the calibration pattern, may be repeated for each print agent color available to the print apparatus 100 (e.g. each die 108 may print an image according to the calibration pattern in for different colors). The plurality of different densities used when printing the patches of the first color may be the same as the plurality of different densities used when printing the patches of the second color, such that corresponding patches printed with print agent of different colors have corresponding densities.

Once the image has been printed, the calibration method involves scanning the image. Thus, at block 404, the method 400 comprises scanning, using a scanning unit, the images formed on the printable substrate 104 to generate scanned image data, wherein the images in the first color are scanned by a first scanning module of the scanning unit and the images in the second color are scanned by a second scanning module of the scanning unit. That is to say, the scanning unit used to scan the images formed on the printable substrate 104 includes multiple scanning modules, and each scanning module is used to scan the images formed in print agent of just one color. Thus, in the example shown in FIG. 1, a first scanning module may be used to scan the images formed using cyan print agent, a second scanning module may be used to scan the images formed using yellow print agent, a third scanning module may be used to scan the images formed using magenta print agent and a fourth scanning module may be used to scan the images formed using black print agent.

The method 400 comprises, at block 406, analyzing, using processing apparatus, the scanned image data to identify any differences between printed densities of corresponding patches in different images of the same color. In other words, corresponding patches (i.e. patches that are intended to be printed with the same color density) printed by different dies 108 of the print apparatus may be compared to determine if the density of a patch printed by one die differs from the density of a corresponding patch printed by another die. Such a difference in the density may be indicative of a color nonuniformity between the dies.

At block 408, the method 400 comprises performing a calibration based on the analysis performed at block 406. Various calibrations may be performed based on the analysis performed at block 406. In one example, if it is determined that a patch printed by one die has a density that is lower than the density of a corresponding patch printed by another die, then a parameter may be adjusted to cause a change in the amount of print agent deposited from one of the dies. For example, an adjustment may be made to cause more print agent (e.g. by increasing a volume of the drops or number of drops) to be delivered from nozzles of the die that printed the lower density patch.

As will be apparent from the above discussion, according to the present disclosure, images may be printed according to the calibration pattern in all of the print agent colors available in the print apparatus 100, by every die 108 of a print bar 102 of the print apparatus. Moreover, the images may be printed on a single sheet or portion of web substrate 104 during a single printing operation. As noted above, the print bar 102 of a page wide array print apparatus 100 extends across the width of the printable substrate 104, and the printable substrate may have a width excess of 100 cm. The particular calibration pattern used in the above method 400, and the way in which the images are arranged on the printable substrate make it possible for all of the images to be scanned during a single scanning operation. For example, assuming the images shown in FIG. 1 are printed on a web substrate, the web substrate may, following the printing operation (block 402), be trimmed or cut just below the images printed in cyan print agent and just above the images printed in black print agent. The trimmed piece of printable substrate 104 may then be scanned (block 404) in a direction perpendicular to the substrate advance direction (e.g. perpendicular to the longitudinal axis of the printable substrate).

Figure 5:
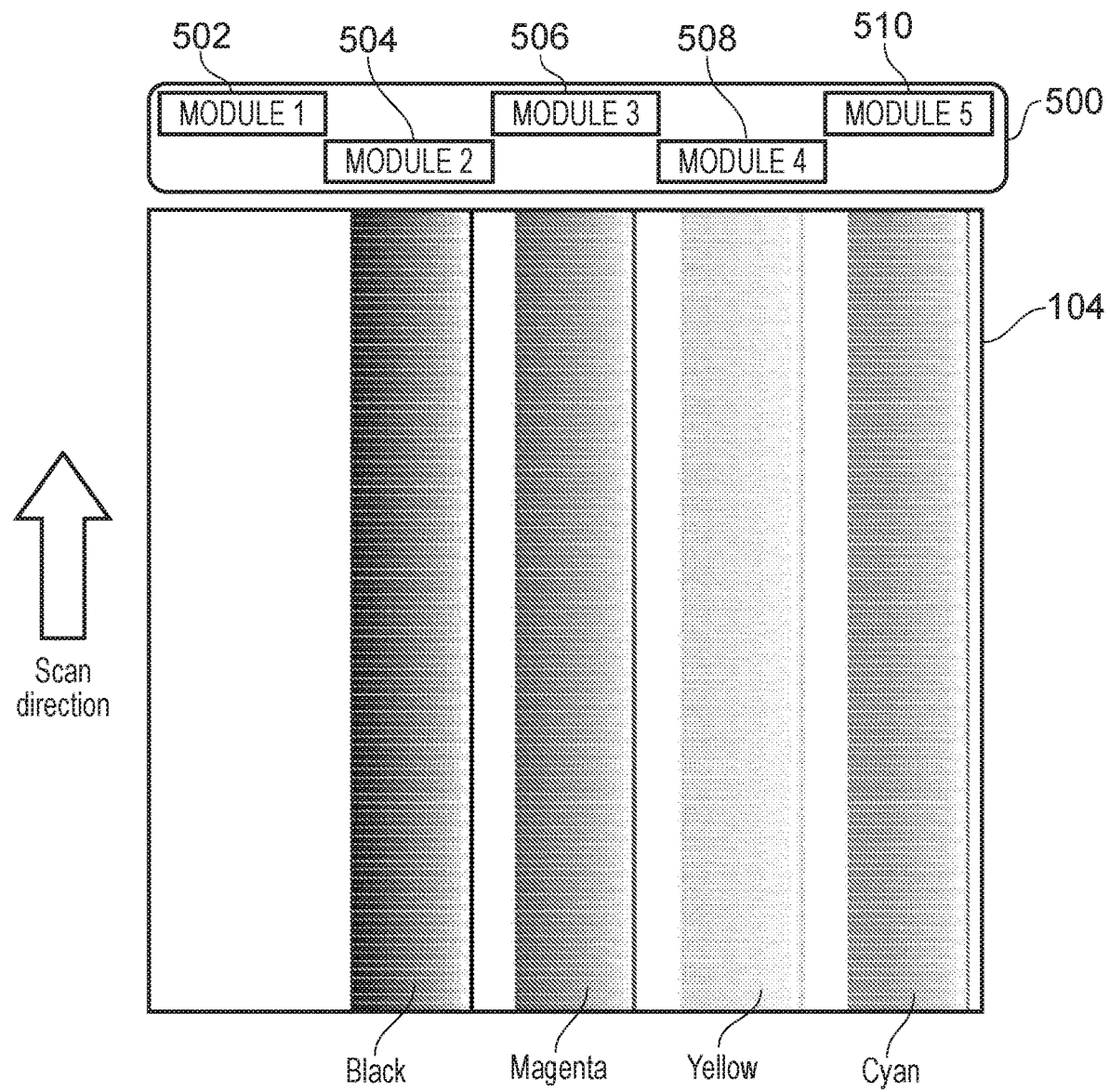
FIG. 5 is a schematic illustration of a scanning unit and the printable substrate of FIG. 1.

FIG. 5 is a schematic illustration of an example of how a scanning operation (block 404) may be performed according to present disclosure. FIG. 5 shows a scanning unit 500 and a portion of the printable substrate 104 shown in FIG. 1, with images formed by each of the dies 108 in cyan, yellow, magenta and black. The scanning unit 500 comprises a plurality of scanning modules: scanning module #1 502, scanning module #2 504, scanning module #3 506, scanning module #4 508 and scanning module #5 510. In other examples, the scanning unit 500 may comprise more or fewer scanning modules.

In examples disclosed herein and shown in the Figures, the images formed according to the calibration pattern in a particular color are formed side-by-side across the printable substrate 104. According to some examples, the images in the first color may be printed side by side across the printable substrate and the images in the second color may be printed side by side across the printable substrate in a position spaced apart in a longitudinal direction from the images printed in the first color. In the example shown in FIG. 5, the images formed in black print agent are formed in a first row, the images formed in magenta print agent formed on a second row, the images formed in yellow print agent performed in a third row, and the images formed in cyan print agent are formed in a fourth row. The rows of images of one color are spaced apart from the rows of images of another color. In some examples, the spacing between each row of images is based on the arrangement of scanning modules in the scanning unit. Thus, in this example, the rows of images of different colors are spaced apart such that each row of images is aligned with one of the scanning modules of the scanning unit 500. In this way, each row of images can be scanned by one of the scanning modules. In the example shown, the row of images in black print agent are positioned such that they can be scanned by the scanning module #2 504, the row of images in magenta print agent are positioned such that they can be scanned by the scanning module #3 506, the row of images in yellow print agent are positioned such that they can be scanned by the scanning module #4 508, and the row of images in cyan print agent are positioned such that they can be scanned by the scanning module #5 510. In some examples, the scanning unit 500 may comprise a scanning module for each color of print agent available in the print apparatus 100 (e.g. four scanning modules for a print apparatus that is to print in cyan, yellow, magenta black). However, the extra scanning module (i.e. the scanning module #1 504) may be used to scan other printed information or images (not shown in FIG. 5). For example, an image or images may be printed on the printable substrate 104 after the row of images in black print agent, that can be used to perform a different calibration operation. In one example, images may be printed that can be scanned using the scanning module #1 504, and data acquired by the scanning module #1 may be used to perform a calibration relating to a distance between nozzles of the dies 108 and the printable substrate 104 (sometimes referred to as a pen-to-paper spacing calibration).

To enable each row of images to be scanned by an individual scanning module, the calibration pattern may be such that the length of each image (i.e. in a direction parallel to the longitudinal axis of the printable substrate 104 or parallel to the substance advance direction) is within particular limits with regard to the size (e.g. the width) of the scanning modules. In some examples, a length of each image may be equal to or less than a width of each scanning module, such that the images printed in the first color can all be scanned by the first scanning module and the images printed in the second color can all be scanned by the second scanning module.

In some examples, the scanning unit 500 may form part of the print apparatus 100, such that, once the images have been printed onto the printable substrate 104, the printed portion of the printable substrate may be removed and fed into the scanning unit 500. If the printable substrate 104 comprises a page or sheet of substrate, then the page or sheet of substrate may be removed and provided to the scanning unit 500 while, if the printable substrate comprises a web substrate, then the printed portion may be cut or trimmed before being provided to the scanning unit. In some examples, following printing of the images, the printable substrate 104 may be rotated (e.g. by 90°) to be scanned. More generally, a scanning direction (i.e. a direction in which the images are scanned) may be perpendicular to the substrate advance direction.

Figure 6:
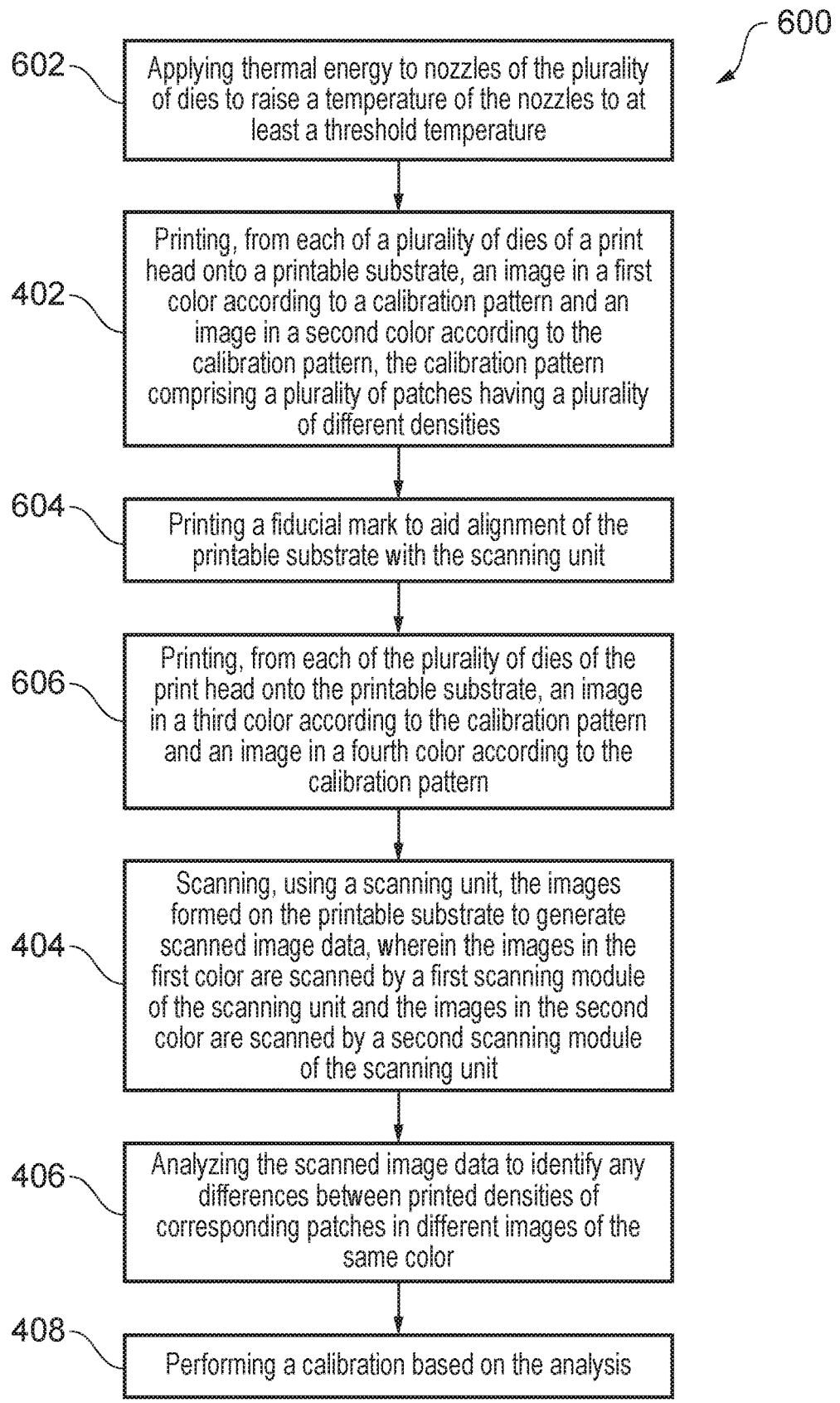
FIG. 6 is a flowchart of a further example of print apparatus calibration method.

FIG. 6 is a flowchart of a further example of a method 600, which may be considered to be a print apparatus calibration method. The method 600 may comprise a block or blocks of the method 400 discussed herein.

The method 600 may comprise, at block 602, prior to said printing, applying thermal energy to nozzles of the plurality of dies 108 to raise a temperature of the nozzles to at least a threshold temperature. Causing the nozzles to become warmer prior to printing may help to reduce or eliminate print defects that might otherwise adversely affect the calibration performed using the printed images. For example, providing thermal energy to the nozzles of the dies 108 may help to eliminate air bubbles inside nozzles, and may bring all of the nozzles to approximately the same temperature. In some examples, a suitable threshold nozzle temperature may be around 50 to 70 degrees centigrade.

At block 604, the method may comprise printing a fiducial mark to aid alignment of the printable substrate 104 with the scanning unit 500. For example, print agent may be deposited from a die 108 or multiple dies of the print apparatus 100 during the printing operation to form a fiducial mark or multiple fiducial marks on the printable substrate 104. A fiducial mark may comprise a spot, a line, a cross, or any other shape or formation may be used to position and/or align the printable substrate 104 when the printable substrate is provided to the scanning unit 500 for scanning. Examples of fiducial marks may be formed at block 604 are shown between the rows of black and magenta images and between the rows of yellow and cyan images in FIG. 1.

As noted above, each die 108 of the print apparatus 100 may print images according to a calibration pattern in print agent of each color available in the print apparatus. Thus, the method 600 may comprise, at block 606, printing, from each of the plurality of dies 108 of the print head 106 onto the printable substrate 104, an image in a third color according to the calibration pattern and an image in a fourth color according to the calibration pattern. The images in the third color may be scanned by a third scanning module of the scanning unit 500 and the images in the fourth color may be scanned by a fourth scanning module of the scanning unit.

It is noted above that the methods disclosed herein may be used to perform various calibration operations in respect of the print apparatus 100. One such calibration may comprise a color uniformity calibration. In some examples, therefore, performing the calibration (block 408) may comprise converting the scanned image data into color space data. For example, the scanned image data may be converted into data the CIE L*a*b* color space. The conversion may be performed using a relationship table between the scanned image data and the CIE L*a*b* color space. Performing the calibration (block 408) may further comprise determining, based on the color space data, an adjustment to be made to an amount of print agent to be delivered using a die 108 of the print head 106. Various calibration techniques may be performed using the scanned image data. For example, a printhead alignment calibration may be performed by scanning and analyzing printed calibration patterns. In some examples, image quality check procedures may be performed, for example examining nozzle health by scanning a printed image or pattern and detecting potential damaged nozzles. As noted briefly above, a "pen-to-paper" space calibration may be performed to measure the distance between nozzles and the printable substrate.

Figure 7:
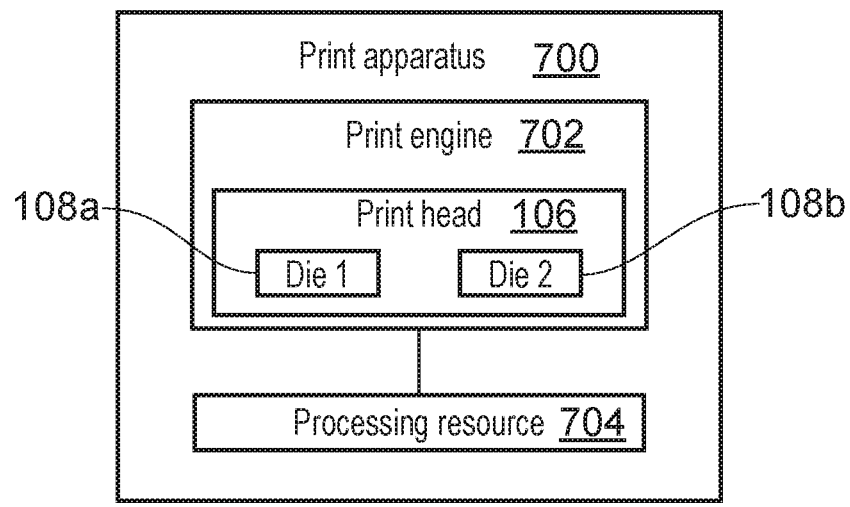
FIG. 7 is a schematic illustration of an example of a print apparatus.

According to various examples, the present disclosure also relates to a print apparatus. The print apparatus may, in some examples, comprise a page wide array (PWA) print apparatus. FIG. 7 is a schematic illustration of an example of a print apparatus 700. The print apparatus 700 comprises a print engine 702 comprising a print head 106. The print engine is to print, from nozzles of a first die 108a of the print head 106 onto print media 104, an image in a first color and an image in a second color, the images being based on a pattern comprising a plurality of patches of different densities; and print, from nozzles of a second die 108b of the print head onto the print media, an image in the first color and an image in the second color, the images being based on the pattern. The image in the first color may be formed by printing the image using print agent of the first color, and the image in the second color may be formed by printing the image using print agent of the second color. The pattern may comprise the calibration pattern discussed above and shown in FIG. 3, for example.

The print apparatus 700 also comprises a processing resource 704. The processing resource 704 may be operatively coupled to the print engine 702 and other components (not shown) of the print apparatus 700. The processing resource 704 may receive scanned image data generated by scanning the images in the first color using a first scanning module (e.g. the scanning module 504) and by scanning the images in the second color using a second scanning module (e.g. the scanning module 506).

The processing resource 704 may analyze the scanned image data to identify any differences between print agent densities printed in corresponding patches of images in the first color or between print agent densities printed in corresponding patches of images in the second color. For example, if the analysis indicates that a patch in an image printed by the second die as a density or saturation lower than the density or saturation of a corresponding patch (e.g. the patch in the same position of the calibration pattern) in an image printed by the first die, then it may be determined that a color nonuniformity exists between the first and second dies.

The processing resource 704 may perform a calibration based on the analysis. In some examples, the processing resource 704 may perform the calibration by adjusting a parameter of the print engine 702 to change an amount of print agent that is to be delivered via nozzles of the first die 108a or the second die 108b.

Figure 8:
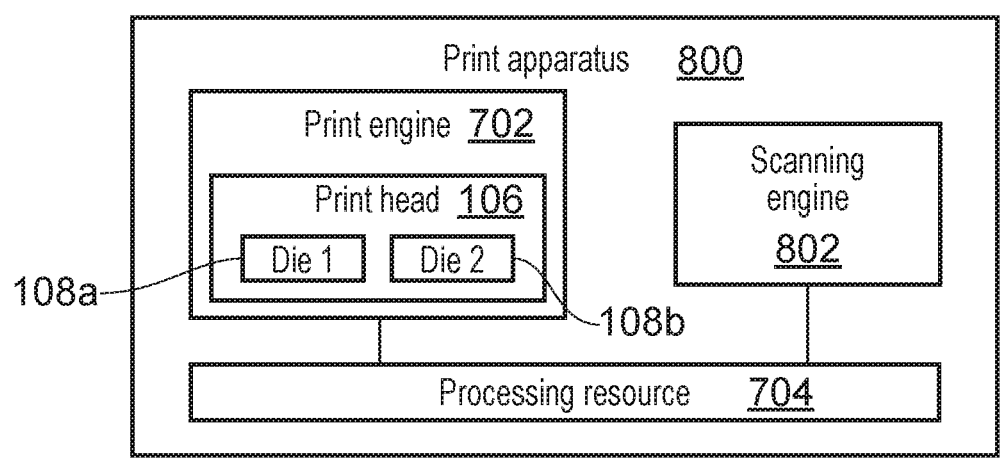
FIG. 8 is a schematic illustration of a further example of a print apparatus.

FIG. 8 is a schematic illustration of a further example of a print apparatus 800. The print apparatus 800 may comprise the print engine 702 and the processing resource 704. Similarly, the print engine 702 may include the print head 106, which houses first and second dies 108a and 108b. The print apparatus 800 may further comprise a scanning engine 802 having a least the first scanning module and the second scanning module to scan the print media 104 to generate the scanned image data.

Figure 9:
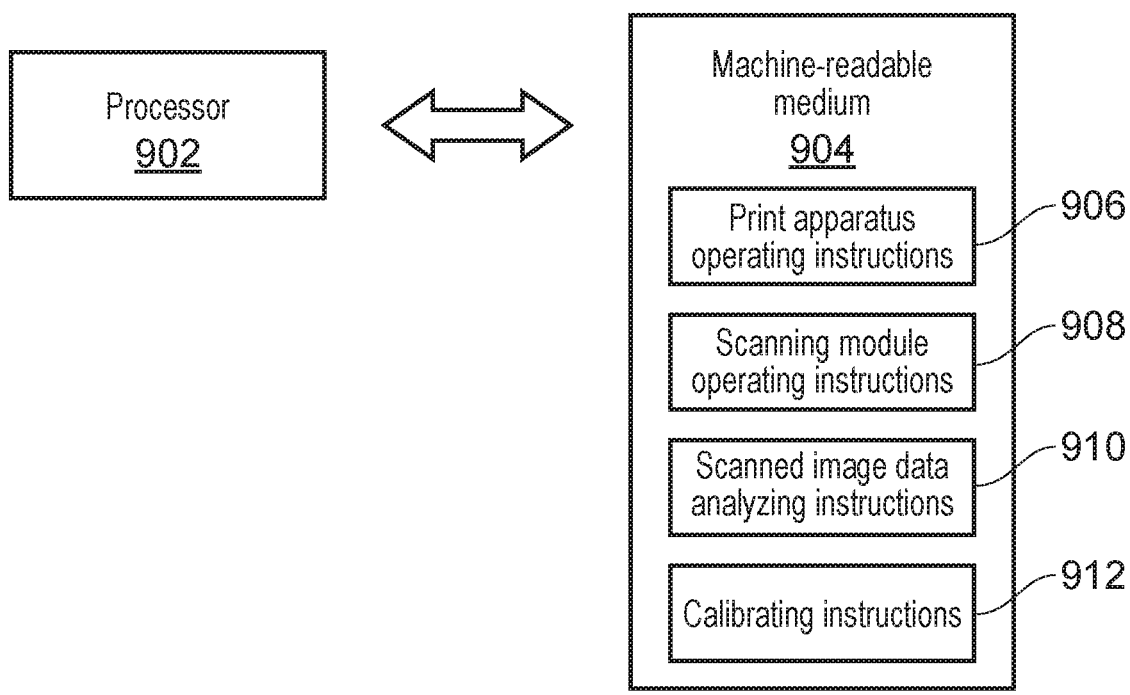
FIG. 9 is a schematic illustration of a processor in communication with a machine-readable medium.

According to various examples, the present disclosure also relates to a machine-readable medium. FIG. 9 is a schematic illustration of a processor 902 in communication with a machine-readable medium 904. The machine-readable medium 904 may comprise instructions (e.g. print apparatus operating instructions 906) which, when executed by the processor 902, cause the processor to operate a print apparatus 100, 700, 800 to deliver print agent, from each of a plurality of dies of a print head onto a print agent receiving surface 104, to form from each die an image in a first color and an image in a second color, wherein each image is based on a calibration pattern comprising a plurality of regions having a plurality of different print density levels.

The machine-readable medium 904 may comprise instructions (e.g. scanning module operating instructions 908) which, when executed by the processor 902, cause the processor to operate a first scanning module of a scanning unit 500 to scan the images formed on the print agent receiving surface in the first color, and a second scanning module of the scanning unit to scan the images formed on the print agent receiving surface in the second color, to generate scanned image data.

The machine-readable medium 904 may comprise instructions (e.g. scanned image data analyzing instructions 910) which, when executed by the processor 902, cause the processor to analyze the scanned image data to identify a discrepancy between the print density levels of corresponding regions in different images of the same color.

The machine-readable medium 904 may comprise instructions (e.g. calibrating instructions 912) which, when executed by the processor 902, cause the processor to perform a calibration operation based on the analysis.

Examples disclosed herein provide a mechanism by which calibration images (e.g. images printed according to a calibration pattern) can be printed onto a printable substrate, then scanned using a scanning unit, such as an off-the-shelf scanner. By printing the images in a particular arrangement as disclosed herein, images printed by different dies and in the same color can be scanned using a single scanning module of the scanner. In this way, the acquired scanned image is of a quality high enough to be used in a calibration operation, such that more specialist equipment (e.g. a spectrophotometer) is not used. According to the present disclosure, while the printed substrate may be manually loaded into the scanning unit the calibration images may be printed onto a single sheet or region of web substrate and, therefore, time savings may be made compared to previous techniques were printed. The accuracy of using a scanner according to the present disclosure to detect small differences in color densities is improved with respect to line sensors which were used in previous techniques.

Examples in the present disclosure can be provided as methods, systems or machine-readable instructions, such as any combination of software, hardware, firmware or the like. Such machine-readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A print apparatus calibration method comprising:
printing, from each of a plurality of dies of a print head onto a printable substrate, a first image in a first color according to a calibration pattern and a second image in a second color according to the calibration pattern, the calibration pattern comprising a plurality of patches having a plurality of different densities, wherein a first die of the plurality of dies prints the first image in the first color according to the calibration pattern and a second die of the plurality of dies prints the second image in the second color according to the calibration pattern, wherein the first image in the first color printed by the first die is located in a same corresponding position of the calibration pattern as the second image in the second color printed by the second die;
scanning the first and second images formed on the printable substrate to generate scanned image data, wherein the first image in the first color is scanned by a first scanning module and the second image in the second color is scanned by a second scanning module;
analyzing, using a processing apparatus, the scanned image data to identify any differences between printed densities of the first color printed by the first die in the same position of the calibration pattern in the first image and the second color printed by the second die in the same position of the calibration pattern in the second image; and
performing a calibration based on the analysis.

2. A print apparatus calibration method according to claim 1, wherein a length of each image is equal to or less than a width of each scanning module, such that the images printed in the first color can all be scanned by the first scanning module and the images printed in the second color can all be scanned by the second scanning module.

3. A print apparatus calibration method according to claim 1, wherein the images in the first color are printed side by side across the printable substrate and the images in the second color are printed side by side across the printable substrate in a position spaced apart in a longitudinal direction from the images printed in the first color.

4. A print apparatus calibration method according to claim 1, wherein the patches in the calibration pattern are arranged in order of decreasing density.

5. A print apparatus calibration method according to claim 1, wherein the densities of the patches range from 0% density to 100% density.

6. A print apparatus calibration method according to claim 1, wherein the calibration pattern comprises at least 32 patches.

7. A print apparatus calibration method according to claim 1, further comprising:
printing a fiducial mark to aid alignment of the printable substrate.

8. A print apparatus calibration method according to claim 1, further comprising:
printing, from each of the plurality of dies of the print head onto the printable substrate, a third image in a third color according to the calibration pattern and a fourth image in a fourth color according to the calibration pattern;
wherein the images in the third color are scanned by a third scanning module and the images in the fourth color are scanned by a fourth scanning module.

9. A print apparatus calibration method according to claim 1, further comprising:
prior to said printing, applying thermal energy to nozzles of the plurality of dies to raise a temperature of the nozzles to at least a threshold temperature.

10. A print apparatus calibration method according to claim 1, wherein performing the calibration comprises:
converting the scanned image data into color space data; and
determining, based on the color space data, an adjustment to be made to an amount of print agent to be delivered using a die of the print head.

11. A print apparatus, comprising:
a print engine comprising a print head, the print engine to:
print, from nozzles of a first die of the print head onto print media, a first image in a first color and a second image in a second color, the images being based on a pattern comprising a plurality of patches of different densities; and
print, from nozzles of a second die of the print head onto the print media, a first image in the first color and a second image in the second color, the images being based on the pattern, wherein the first color printed by the first die on the first image is located in a same corresponding position of the pattern as the first color printed by the second die, and wherein the second color printed by the first die on the first image is located in a same corresponding position of the pattern as the second color printed by the second die; and
a processing resource to:
receive scanned image data generated by scanning the first and second images in the first color using a first scanning module and by scanning the first and second images in the second color using a second scanning module;
analyze the scanned image data to identify any differences between print agent densities of the first color printed by the first die on the first image located in the same corresponding position of the pattern as the first color printed by the second die, or of the second color printed by the first die on the first image located in the same corresponding position of the pattern as the second color printed by the second die; and
perform a calibration based on the analysis.

12. A print apparatus according to claim 11, further comprising:
a scanning engine having a least the first scanning module and the second scanning module to scan the print media to generate the scanned image data.

13. A print apparatus according to claim 11, wherein the print apparatus further comprises a page wide array print apparatus.

14. A print apparatus according to claim 11, wherein the processing resource is to perform the calibration by:
adjusting a parameter of the print engine to change an amount of print agent that is to be delivered via nozzles of the first die or the second die.

15. A non-transitory machine-readable medium comprising instructions which, when executed by a processor, cause the processor to:
operate a print apparatus to deliver print agent, from each of a plurality of dies of a print head onto a print agent receiving surface, to form from each die a first image in a first color and a second image in a second color, wherein each image is based on a calibration pattern comprising a plurality of regions having a plurality of different print density levels, wherein a first die of the plurality of dies prints the first image in the first color according to the calibration pattern and a second die of the plurality of dies prints the second image in the second color according to the calibration pattern, wherein the first image in the first color printed by the first die is located in a same corresponding position of the calibration pattern as the second image in the second color printed by the second die;
operate:
a first scanning module to scan the first and second images formed on the print agent receiving surface in the first color; and
a second scanning module to scan the first and second images formed on the print agent receiving surface in the second color, to generate scanned image data;
analyze the scanned image data to identify a discrepancy between the print density levels of the first color printed by the first die in the same position of the calibration pattern in the first image and the second color printed by the second die in the same position of the calibration pattern in the second image; and
perform a calibration operation based on the analysis.

* * * * *